(12) United States Patent
Borgmann et al.

(10) Patent No.: US 6,541,962 B1
(45) Date of Patent: Apr. 1, 2003

(54) DEVICE FOR DETECTING THE ANGLE POSITION OF A MOTOR VEHICLE STEERING WHEEL

(75) Inventors: Uwe Borgmann, Recklinghausen (DE); Michael Köster, Dortmund (DE)

(73) Assignee: Leopold Kostal GmbH & Co., Ludenscheid (DE)

( * ) Notice: Subject to any disclaimer, the term of this patent is extended or adjusted under 35 U.S.C. 154(b) by 0 days.

(21) Appl. No.: 09/857,666

(22) PCT Filed: Feb. 2, 2000

(86) PCT No.: PCT/EP00/00845
§ 371 (c)(1),
(2), (4) Date: Jun. 7, 2001

(87) PCT Pub. No.: WO00/46093
PCT Pub. Date: Aug. 10, 2000

(30) Foreign Application Priority Data

Feb. 2, 1999 (DE) .......................... 199 04 000

(51) Int. Cl.$^7$ ................... G01B 7/30; H01R 35/04
(52) U.S. Cl. .................. 324/207.17; 324/207.22; 324/207.25; 180/443; 439/164
(58) Field of Search ............... 324/207.16, 207.25, 324/207.22; 180/443–446; 439/164

(56) References Cited

U.S. PATENT DOCUMENTS

| | | | | |
|---|---|---|---|---|
| 4,223,300 A | * | 9/1980 | Wiklund | 310/49 A |
| 5,504,427 A | * | 4/1996 | Cooper et al. | 324/207.13 |
| 5,637,997 A | * | 6/1997 | Hore et al. | 324/207.16 |
| 5,944,544 A | * | 8/1999 | Kuroda et al. | 439/15 |
| 5,971,782 A | * | 10/1999 | Masuda | 439/164 |
| 6,147,416 A | * | 11/2000 | Mitsuzuka | 200/61.54 |
| 6,155,106 A | * | 12/2000 | Sano | 33/1 N |

FOREIGN PATENT DOCUMENTS

| | | | | |
|---|---|---|---|---|
| DE | 4123781 | | 1/1993 | |
| DE | 4437941 A1 | * | 4/1996 | G01B/7/30 |
| DE | 19835886 | | 2/1999 | |

* cited by examiner

*Primary Examiner*—Edward Lefkowitz
*Assistant Examiner*—Darrell Kinder
(74) *Attorney, Agent, or Firm*—Brooks & Kushman, P.C.

(57) ABSTRACT

The invention relates to a device for detecting the angle position of the steering wheel of a motor vehicle. The aim of the invention is to provide a device of this kind in which the technical problem of determining the absolute angle position of the steering wheel in a measuring range greater than 360° is solved without the need for mechanical reduction gears and such like. This is achieved by means of a measurement system comprising at least one coil system which cooperates with an electrically conductive structure configured on/in a flexible flat cable (6). The flexible flat cable (6) is wound in a winding gap situated between the outer lateral surface (3) of an inner cylindrical rotor (1) joined to the steering gear shaft and the inner lateral surface (4) of an outer cylindrical stator (2) joined to the steering column, in such a way that its one end is fixed to the rotor (1) and its other to the stator (2).

13 Claims, 4 Drawing Sheets a)

b)

DEVICE FOR DETECTING THE ANGLE POSITION OF A MOTOR VEHICLE STEERING WHEEL

TECHNICAL FIELD

The invention pertains to a device for determining the angular position of the steering wheel of a motor vehicle.

BACKGROUND ART

The steering angle or the steering angle lock of motor vehicles is needed to apply to a driving dynamics control system, for example. Now this kind of driving dynamics control system receives the aforementioned steering angle value, in addition to other measured data, such as the wheel velocities or the rotation of the motor vehicle about its vertical axis. But the absolute steering angle lock and also the steering velocity are needed so that these values, together with the other measured data, can be evaluated by the driving dynamics system and then used to control actuators, for example, the brakes and/or the drive force transmission.

Steering angle sensors are available in a number of different designs using different measuring principles. For example, from DE 43 00 663 C1, a steering angle sensor is known in which light barriers are distributed along the perimeter for sensing of a code placed on an aperture ring. With this sensor it is possible to ascertain the absolute angular setting relative to one complete revolution of the steering wheel.

Likewise relative to one full revolution, the optical-electronic steering angle sensor known from DE 40 22 837 A1 measures the angular position of the steering wheel. The steering angle sensor disclosed in this document consists of two elements positioned in parallel and at a distance to each other—one is a light source and the other is a line sensor—and also a code disk located between the light source and the line sensor; said code disk is connected to and rotates with the steering wheel spindle. A CCD sensor is used as the line sensor in this case. The code generator is designed as a light slit disk and for its code track it uses a spiral increasing in size from inside to outside. By means of the lighting of the image points of the cell sensor at a particular steering lock, it is possible to obtain information about the actual steering angle lock.

As coding for this code disk, an archimedean spiral extending across 360° is used. With this steering angle sensor, it is possible to determine absolute steering wheel angular settings only in the range of the coding, so that there, too, the operation is limited to a range of 360°. Steering wheels of motor vehicles, however, can be rotated by far more than 360°. Proceeding from a straight positioning of the wheels and thus a zero setting of the steering angle sensor, it is desirable to determine the steering angle accurately in an angular range that covers the entire rotational range of the steering wheel. With the known steering angle sensor, in this regard it is possible only to determine an angular segment, namely in the range of one complete steering wheel lock of 180° to the right and accordingly, 180° to the left—proceeding from the zero setting of the steering wheel. Steering wheels of motor vehicles can turn, for example, three full rotations to the right and accordingly also three full rotations to the left—starting from the zero position—so that a total range of 2160° would have to be measured by a steering angle sensor.

Known solutions to this problem rely on mechanical elements for determining the completed, full revolutions of the steering wheel. This kind of mechanical design is described, e.g., in DE 196 01 965 A1, wherein a 360° optical-electronic sensor is described which is supplemented with a mechanical counter for the revolutions. Based on the mechanical translation gearing used in this device, with this design we in turn lose the advantages of contactless sensor technology, such as non-wear and low-noise attributes.

One possible design using a contactless measuring principle is described in DE 198 35 886 A1, wherein a device to determine the steering angle is disclosed. This device uses a variable inductivity as a measure for the absolute angular setting of the steering wheel even for several revolutions. This variable inductivity is formed by a flat ribbon located between a rotor and an outer housing surrounding it and is designed as a kind of clock spring.

The determination of an inductivity, however, thus necessitates, firstly, a complicated electronic measuring device, and secondly, as shown by the measured results presented in FIGS. 4 to 7 of this patent disclosure, the method selected there is affected by some very large fluctuations in measured values and thus is affected by considerable inaccuracies in the output of the angular value.

SUMMARY OF THE INVENTION

Conversely, the present invention is based on the goal of proposing a steering angle sensor for determining the absolute angular position of the steering wheel of a motor vehicle which likewise has a measured range going beyond 360°, and which is able to achieve more accurate measured results with simple electronic devices and without additional mechanical expense.

This is achieved by the use of a measuring device with at least one coil device which cooperates with an electrically conducting structure implemented on/in a flexible flat ribbon, where the flexible flat ribbon cable is wound up in a winding gap bounded by the outer mantle surface of the inner rotor and the inner mantle surface of the exterior stator positioned at a distance to it, in such a manner that its one end is attached to the rotor and its other end is attached to the stator.

In a first design embodiment, a transmission composed of two magnetically linked coil devices is provided, wherein one of the two coil devices is formed at least by a circuit path extending on/in the flat ribbon cable along its longitudinal axis, and the other coil device is designed as a transmission coil provided for induction of a measuring voltage in the first coil device and is positioned coaxially to the stator and is mechanically connected to it.

In this case, it is favorable if the coil designed as a transmission coil, located coaxial to the stator, is connected electrically to a circuit generating a high-frequency alternating current.

One particularly simple mechanical structure can be obtained when the coil designed as transmission coil and positioned coaxial to the stator is designed by means of circuit path structures printed on an electronic circuit board.

The return of the measured signal from the rotor to the stator side takes place in this design format, preferably by a capacitive coupling or by means of an electrically conducting steering wheel spindle.

In yet another design, the coil surface of the at least one coil device is aligned in parallel with the mantle surface of stator and rotor.

Another refinement of this design provides that, due to the circuit path structure implemented on/in the flat ribbon cable, a coil device is formed which, together with the first coil device, forms a transmission, where the steering angle between the two coil devices is determined by the angular position of the steering wheel.

One of the two coil devices can be designed, e.g., as an electrically conducting structure applied to one mantle surface of the stator.

The flat ribbon cable can be positioned in such a manner that the flat ribbon cable is coiled up in a spiral shape with the same sense of direction persisting across its entire length in any rotor position, and in the two end positions of the rotor rotation, on the one hand it rests almost completely against the outer mantle surface of the rotor, and on the other hand it rests almost completely against the inner mantle surface of the stator.

As an alternative to this, the flat ribbon cable is coiled up so that in the middle position of the steering wheel, one section thereof is coiled in one direction resting against the outer mantle surface of the rotor, and an additional section is coiled up in the opposing direction resting against the inner mantle surface of the stator, so that a loop reversing the coil direction is formed between the two sections.

One particularly preferred use of one of these devices is for determining the angular position of the steering wheel in a steering column or steering wheel unit in which a coil spring cassette is used for transmission of electrical current between the steering column as stator, and the steering shaft as rotor. In this kind of coil spring cassette, the power-transmission lines are combined in one or more flat ribbon cables, which are wound up in the winding gap formed by rotor and stator. In addition to these existing electrical circuit paths, additional ones can be provided at no great expense for the determination of the angular position of the steering wheel according to this invention, provided that the existing lines cannot be used for this purpose, e.g., by separation and filtering of the signals in the frequency range.

It is also favorable to use one of the described devices in combination with an additional steering angle determining device which features a more limited measuring range with respect to the existing device, but which instead has a greater resolution, for simultaneous determination of the absolute value of the steering angle by use of a coarse and a fine determination.

BRIEF DESCRIPTION OF THE DRAWINGS

Additional embodiments and favorable refinements of the device according to this invention and are also indicated from the following description of the attached figures. These figures illustrate the design formats of the article according to this invention and explain it in greater detail.

DETAILED DESCRIPTION OF THE PREFERRED EMBODIMENT(S)

Figure 1:
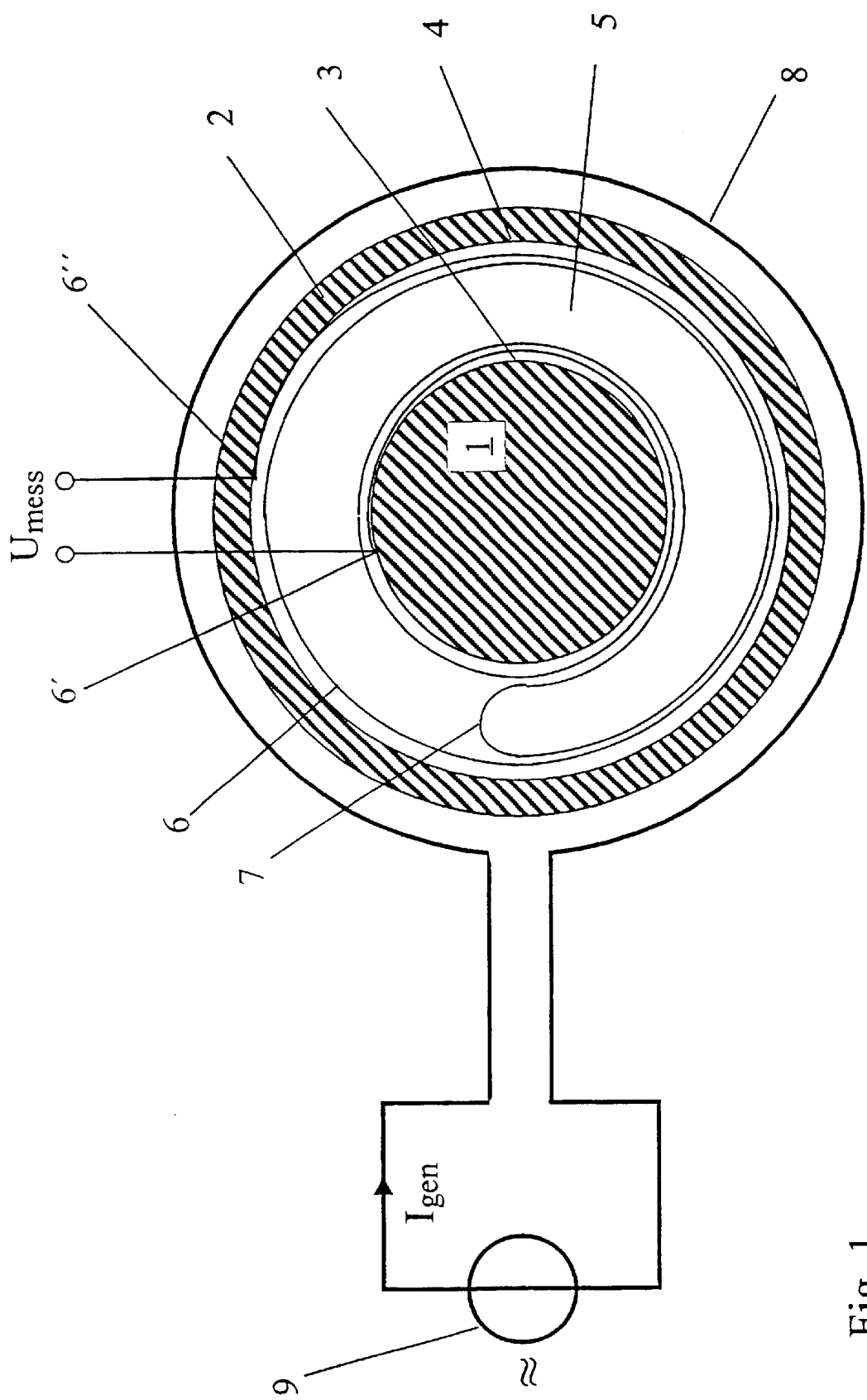
FIG. 1 is a schematic illustration of a first design example of the device to determine the steering angle according to this invention and shown in cross section.

As is evident in FIG. 1, in this first design format of the device to determine the steering angle according to this invention, the rotor 1 connected to the steering wheel spindle and the stator 2 of a coil spring cassette connected to the steering column are positioned concentric to the steering wheel spindle and at a distance to each other, so that a coil gap 5 is formed which is bounded by the outer mantle surface 3 of the interior rotor 1 and the inner mantle surface 4 of the outer stator 2. A flexible flat ribbon cable 6 having several electric circuit paths extending along its longitudinal axis is coiled up within said coil gap in such a manner that its one end 6' is attached to the rotor 1, and its other end 6" is attached to the stator 2, and the electric circuit paths—one of which is provided for the purpose of determining the steering angle and the other for transmission of electric energy and signals between steering column and steering wheel—are contacted there.

The flat ribbon cable 6 in this case is wound up so that in the middle setting of the steering wheel, a section thereof beginning at the rotor-side end 6' is coiled up in a clockwise direction proceeding from there and rests against the outer mantle surface 3 of the rotor 1, then forms a loop 7 reversing the coiling direction, and then continuing, it has a section wound up in a counter-clockwise direction, said section resting against the inner mantle surface 4 of the stator 2 and ending at the stator-side end 6". Concentric to the described configuration of rotor 1 and stator 2, there is a transmission coil 8 which is powered by a circuit 9 (composed of a generator) with an alternating current $I_{gen}$ at high frequency (in the range of about 1 to 10 MHZ). Due to the alternating magnetic field generated by this current, a voltage $U_{mess}$ is induced between the ends 6' and 6" in the electric circuit path of the flat ribbon cable 6 provided for determining the steering angle, and the phase and value of the angular position of the rotor 1 is dependent on this voltage. The value of the voltage in this case increases in the two end positions of rotor rotation, which are generally different; depending on the position of the transmission coil, the voltages in the two end positions can differ in phase by 180°. During rotation of the rotor from one end position to the other, the value of the voltage initially decreases to a value of 0 while retaining the phase, and then increases again at a phase changed by 180°.

Based on a simultaneous knowledge of the value and phase position of the voltage $U_{mess}$, therefore, a definitive characterization of the angular position of the rotor with respect to the stator will be available with respect to the entire rotation range of the steering wheel, which may cover several complete revolutions of the rotor.

Figure 2:
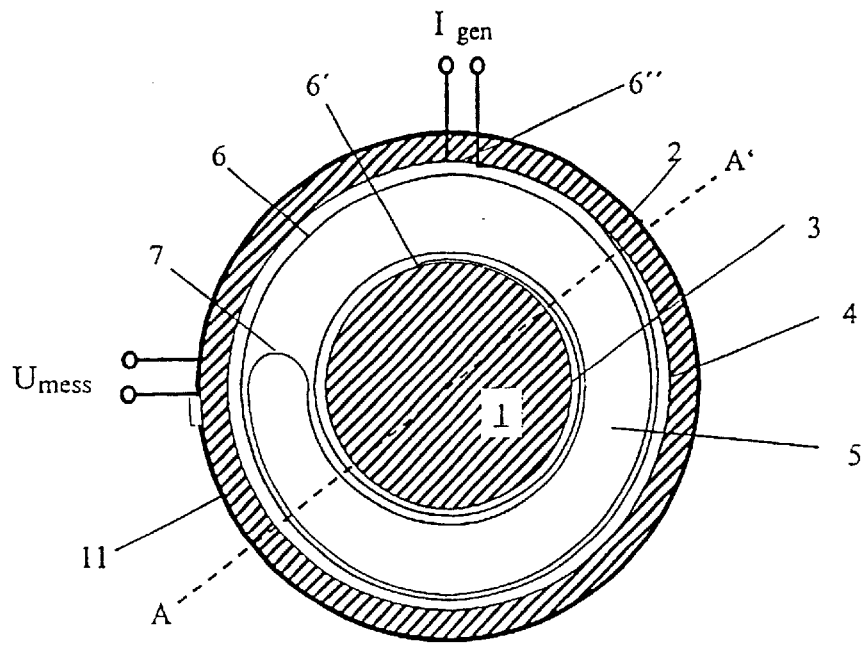
FIG. 2 is a) a schematic illustration of another design format of the invented device to determine the steering angle, shown in cross section b) a cross section along line AA through the object illustrated in a).
Figure 2:
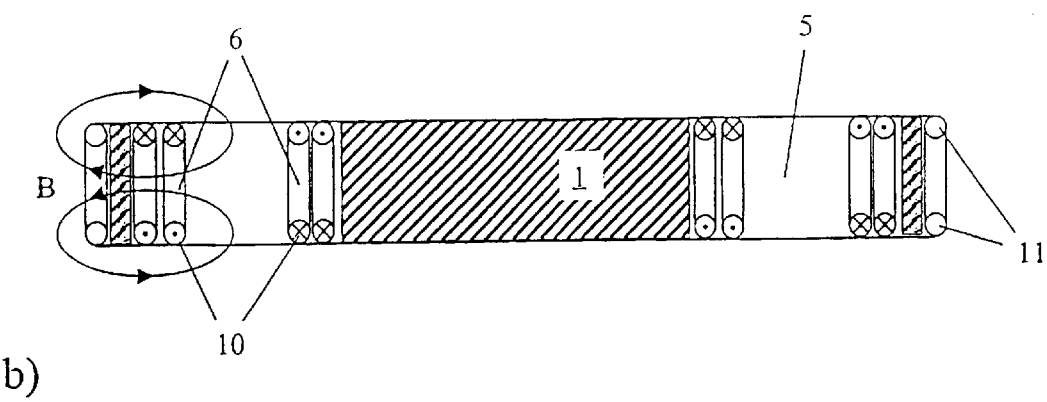

As is illustrated schematically in FIG. 2a, in a different design embodiment of the device to determine the steering angle according to this invention, the rotor 1 connected to the steering wheel spindle and the stator 2 of a coiled spring cassette connected to the steering column are arranged concentric to the axis of the steering wheel spindle and at a distance from each other, so that a coil gap 5 is formed which is bounded by the outer mantle surface 3 of the interior rotor 1 and the inner mantle surface 4 of the outer stator 2. A flexible flat ribbon cable 6, having several electric circuit path structures 10 extending along its longitudinal axis, is coiled up within said coil gap in such a manner that its one end 6' is attached to the rotor 1, and its other end 6" is attached to the stator 2. The electric circuit path structures 10—where they are provided for the purpose of determining the steering angle—are connected electrically only at the stator side and are terminated at the rotor-side end by a short-circuit, an ohmic resistor or a capacitor, whereas additional electric circuit path structures, which are used for the transmission of electric energy and signals between steering column and steering wheel, are electrically connected both on the rotor side and also on the stator side. The flat ribbon cable 6 is wound up so that in the middle position of the steering wheel, a section thereof beginning at the rotor-side end 6' is wound up in a clockwise direction and rests against the outer mantle surface 3 of the rotor 1, then forms a loop 7 reversing the winding direction, and then continuing has a section wound up in a counter-clockwise direction, which rests against the inner mantle surface 4 of the stator 2 and ends at the stator-side end 6". A coil device is located concentric to the described configuration of rotor 1 and stator 2 on the mantle surface of the stator 2.

Figure 3:
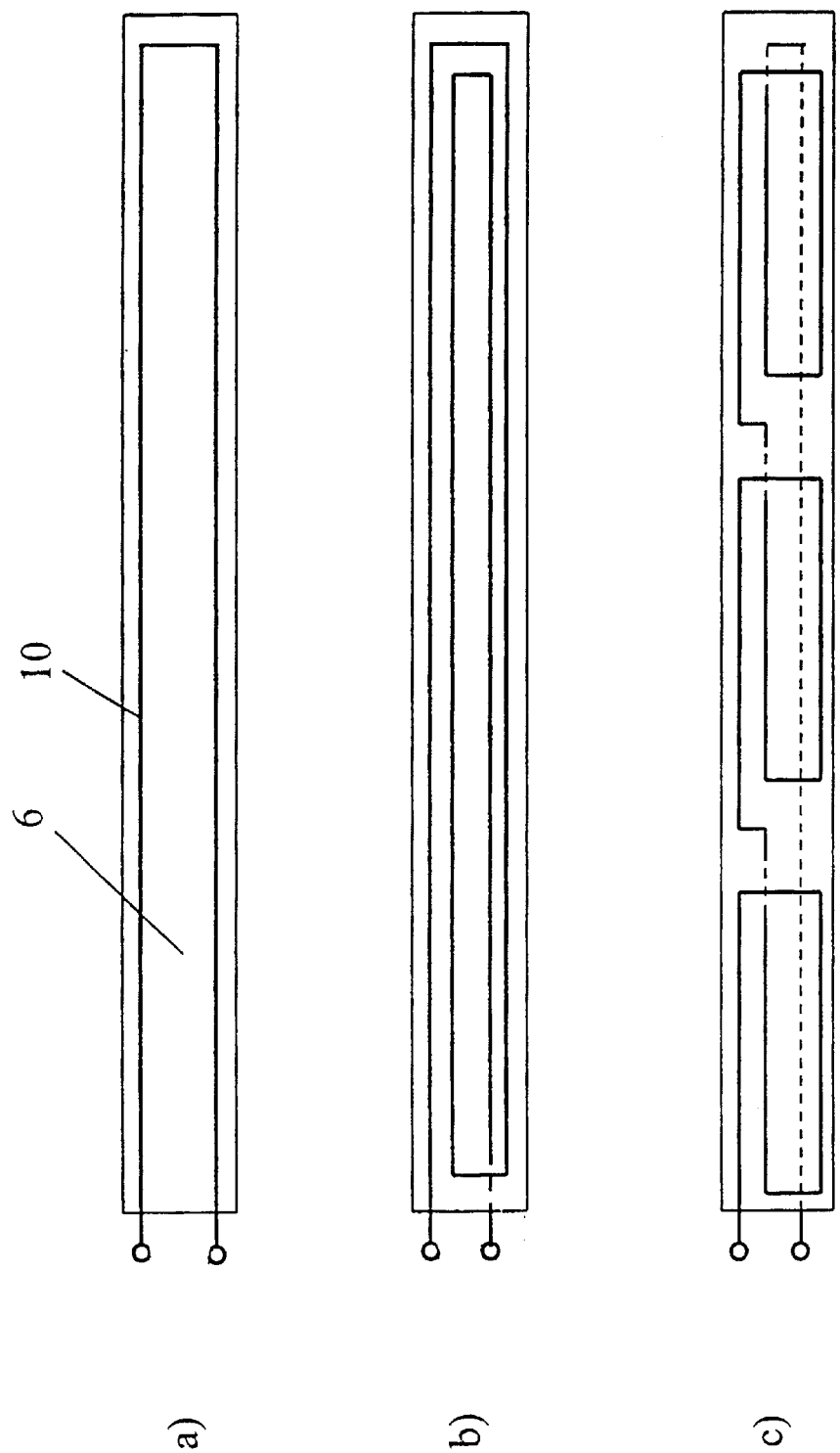
FIG. 3 shows various designs of the circuit path structure on the flexible flat ribbon cable and/or on the mantle surface of the stator in the design format illustrated in FIG. 2.

Due to the circuit path structures 10 which are located on the flexible flat ribbon cable 6, for example, as illustrated in the coiled-up position in FIG. 3*a*, a coil device is formed which is powered by a generator with a high frequency alternating current $I_{gen}$ (in the range of about 1 to 10 MHZ). Due to this current, an alternating magnetic field is created that penetrates essentially radially the surface parallel to the mantle surface of the stator surrounded by this coil device. And thus a voltage $U_{mess}$ is induced between the ends of the second coil device illustrated similarly with a coil applied to the mantle surface of the stator as conducting structure 11. The value of this voltage depends on the surface overlap of the two coil devices and thus on the angular position of the rotor 1.

An instantaneous plot of the current flux and of the magnetic field associated with it is visible in FIG. 2*b*, where the circuit path structure 10 of the flexible conductor 6 and also the circuit path structure 11 of the fixed coil device on the stator side are illustrated as cut away along a line AA' from FIG. 2*a*. The current direction, as is commonplace, is represented by crosses as plunging into the plane of the paper and illustrated by dots as exiting from the plane of the paper.

In the described operating mode as functioning receiving coil circuit path structure 11, an alternating current is induced whose value becomes greater as the percentage of the circuit path structure 10 acting as transmission coil increases; this portion comes to rest against the inner mantle surface 4 of the stator and thus in the immediate vicinity of the circuit path structure 11. But this portion is exactly proportional to the angle of rotation of the steering wheel spindle—shown rotated clockwise in the device indicated in FIG. 2*a*—so that an unambiguous identification is possible of the angular position of the rotor with respect to the stator relative to the total rotational range comprising several complete rotations of the rotor.

FIGS. 3*b* and *c*, for example, show additional possible configurations of the circuit path structure 10 on the flat ribbon cable or on the mantle surface of the stator, which can be selected to achieve different profiles of voltage $U_{mess}$ with the rotational angle of the steering wheel spindle. For example, as indicated schematically in FIG. 3*b*, to increase the total signal, the coil surface can be enlarged by adding several windings, or by means of a series circuit indicated in FIG. 3*c*, several single coils will allow an angular range detection, where combinations of different configurations on the flat ribbon cable and the stator are also possible.

Figure 4:
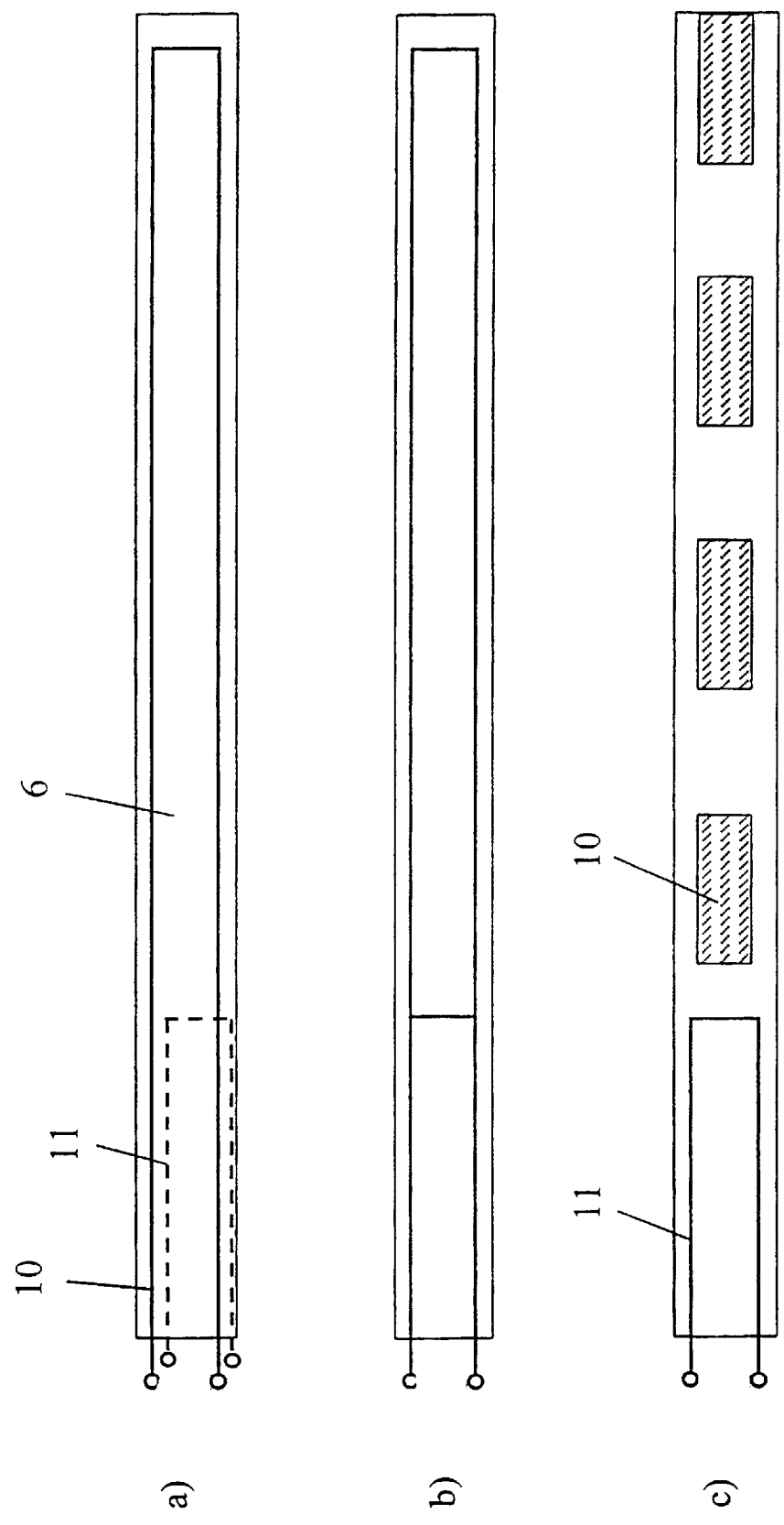
FIG. 4 has additional designs of the circuit path structure on the flexible flat ribbon cable in the design format illustrated in FIG. 2.

FIG. 4*a* shows one possibility for designing the fixed-site coil device connected to the stator on the flexible flat ribbon cable 6, and specifically by lengthening it by a segment having the length of one circle perimeter, which remains always in contact with the inner mantle surface 4 of the stator across the entire range of steering wheel rotation, and on which, in addition to the circuit path structure 10, a second coil device forming a circuit path structure 11 is applied at an offset or is positioned on the back side of the flat ribbon cable 6.

FIG. 4*b* shows an additional design format of the coil devices in which as in the design according to FIG. 4*a*, one section of the flat ribbon cable 6 is provided which remains always in contact with the inner mantle surface 4 of the stator across the entire steering wheel rotational range, and at its end a circuit path loop is shorted, where both an ohmic (as shown here) or also a capacitive short-circuit is possible.

However, this coil device is intended for a different operating mode than that discussed herein, in which one coil is acting as transmission coil and one as reception coil device. But this different operating mode is characterized in that only one, and specifically the one short coil device terminated with the short circuit (ohmic or capacitive) is operated actively, e.g., as part of a resonant circuit, while the other portion of the coil device is acting only as a passive element, which in this case causes, e.g., an angle-dependent damping of the resonance circuit.

However, any conductive material which is brought into the direct vicinity of the actively operated coil device can be used as passive element for damping the resonant circuit, and specifically by means of the eddy currents generated in it, so that even this effect can be specifically employed, e.g., by selecting a design of the electrically conducting structure 10 on the flat ribbon cable 6 as illustrated in FIG. 4*c*, or by using the effect of additional circuit paths provided on the same or on another flat ribbon cable.

The operating mode with only one passive-acting element is quite obviously possible when used in combinations with the other coil devices discussed previously.

What is claimed is:

1. A device for determining the angular position of a steering wheel connected to the steering wheel spindle of a motor vehicle, the device comprising:

a rotor positioned concentric with the steering wheel spindle and connected to the steering wheel spindle for rotation therewith;

a stator positioned concentric with the rotor, wherein an outer surface of the rotor and an inner surface of the stator are separated by a winding gap;

a cable wound around the rotor in the winding gap, the cable having electric circuit paths extending along the cable which form a first coil device, wherein one end of the cable is attached to the rotor and the other end of the cable is attached to the stator; and a second coil device positioned coaxially to the stator and connected to the outer surface of the stator, wherein the second coil device is magnetically linked with the first coil device and is operable for inducting a voltage in the first coil device between the ends of the cable, wherein the voltage inducted in the first coil device is a function of the angular position of the rotor and the steering wheel with respect to the stator.

2. The device of claim 1 wherein:

the second coil device is electrically connected to an alternating current generator in order to induct a voltage in the first coil device.

3. The device of claim 1 wherein:

the second coil device includes one or more circuit paths disposed on an electronic circuit board.

4. The device of claim 1 further comprising:

a processor operable for detecting a capacitive return from the rotor to the stator to determine the voltage inducted in the first coil device.

5. The device of claim 1 further comprising:

a processor operable for determining the voltage inducted in the first coil device by measuring the voltage difference between the stator and the steering wheel spindle.

6. The device of claim 1 wherein:

the cable is wound around the rotor in the winding gap such that a starting cable section having the one end connected to the rotor is wound around the rotor in a first direction and an ending cable section having the other end connected to the stator forms a loop and is wound around the rotor in an opposite direction.

7. A device for determining the angular position of a steering wheel connected to the steering wheel spindle of a motor vehicle, the device comprising:

a cylindrical rotor positioned concentric with the steering wheel spindle and connected to the steering wheel spindle for rotation therewith;

a cylindrical stator positioned concentric with the rotor, wherein an outer surface of the rotor and an inner surface of the stator are separated by a winding gap;

a flat ribbon cable wound up in the winding gap, the cable having an electrically conducting structure, wherein one end of the cable is attached to the rotor and the other end of the cable is attached to the stator; and a first coil device having a coil surface aligned parallel to the outer surface of the rotor and the inner surface of the stator, wherein the first coil device is operable with the electrically conducting structure of the cable to induct a voltage between the ends of the cable, wherein the voltage inducted between the ends of the cable is a function of the angular position of the rotor and the steering wheel spindle with respect to the stator.

8. The device of claim 7 wherein:

the first coil device includes a fixed-position circuit path structure connected to the stator.

9. The device of claim 7 wherein:

the first coil device includes electrically conducting structure means connected to the stator.

10. The device of claim 7 wherein:

the first coil device includes one or more circuit path structures formed on the cable, wherein the one or more circuit path structures of the first coil device are electrically isolated from the electrically conducting structure of the cable.

11. The device of claim 7 wherein:

the first one coil device forms a portion of a resonant circuit operable with an alternating current generator and the electrically conducting structure of the cable is electrically isolated from the alternating current generator.

12. The device of claim 7 wherein:

the cable is wound such that in a middle rotor rotation position, one cable section is wound around the rotor in one direction and rests against the outer surface of the rotor and the other cable section is wound around the rotor in an opposing direction and rests against the inner surface of the stator, such that a loop is formed between the two cable sections.

13. The device of claim 12 wherein:

the cable is wound in a spiral configuration with the same sense of direction persisting across its entire length in any rotor position, wherein in one rotor rotation end position the cable rests against the outer surface of the rotor and in the other rotor rotation end position the cable rests the inner surface of the stator.

* * * * *